United States Patent
Mitra et al.

(10) Patent No.: US 7,313,652 B2
(45) Date of Patent: Dec. 25, 2007

(54) MULTI-LEVEL PERSISTED TEMPLATE CACHING

(75) Inventors: Asim Mitra, Andhra Pr (IN); Andy Morrison, Woodinville, WA (US); Rayner S. D'Souza, Seattle, WA (US); Raymond Ho, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 304 days.

(21) Appl. No.: 11/088,402

(22) Filed: Mar. 24, 2005

(65) Prior Publication Data

US 2005/0172077 A1   Aug. 4, 2005

Related U.S. Application Data

(63) Continuation of application No. 10/389,163, filed on Mar. 14, 2003, now Pat. No. 6,915,384.

(60) Provisional application No. 60/366,794, filed on Mar. 22, 2002.

(51) Int. Cl.
*G06F 12/00* (2006.01)
(52) U.S. Cl. ...................... 711/122; 711/137
(58) Field of Classification Search .............. None
See application file for complete search history.

(56) References Cited

U.S. PATENT DOCUMENTS

| | | | |
|---|---|---|---|
| 5,146,593 A | 9/1992 | Brandle et al. | |
| 5,155,837 A | 10/1992 | Liu et al. | |
| 5,706,507 A | 1/1998 | Schloss | |
| 5,715,386 A | 2/1998 | Fulton, III et al. | |
| 5,918,226 A | 6/1999 | Tarumi et al. | |
| 5,930,830 A | 7/1999 | Mendelson et al. | |
| 6,098,064 A | 8/2000 | Pirolli et al. | |
| 6,188,698 B1 | 2/2001 | Galand et al. | |
| 6,219,760 B1 | 4/2001 | McMinn | |
| 6,223,202 B1 | 4/2001 | Bayeh | |
| 6,463,465 B1 | 10/2002 | Nieuwejaar | |
| 6,542,920 B1 | 4/2003 | Belkin et al. | |
| 6,574,712 B1 | 6/2003 | Kahle et al. | |
| 6,594,784 B1 | 7/2003 | Harper et al. | |
| 6,622,168 B1 | 9/2003 | Datta | |
| 6,629,266 B1 | 9/2003 | Harper et al. | |
| 6,732,138 B1 | 5/2004 | Browning et al. | |
| 6,810,495 B2 | 10/2004 | Castelli et al. | |
| 6,820,215 B2 | 11/2004 | Harper et al. | |
| 6,915,384 B2 | 7/2005 | Mitra et al. | |
| 6,978,398 B2 | 12/2005 | Harper et al. | |
| 2002/0047899 A1 | 4/2002 | Son et al. | |

(Continued)

OTHER PUBLICATIONS

Tanenbaum, "Structured Computer Organization", Prentice-Hall Inc, 1984, pp. 1-5.

(Continued)

*Primary Examiner*—Brian R. Peugh
(74) *Attorney, Agent, or Firm*—Lee & Hayes, PLLC

(57) ABSTRACT

Methods and apparatuses are provided for use with a web server device, and which permit the web server logic to selectively store template data associated with one or more Active Server Pages (ASPs) or other like web pages in a multiple-level template storage arrangement that includes a first level storage mechanism within primary memory and at least one subsequent level storage mechanism within a secondary memory device.

20 Claims, 2 Drawing Sheets

U.S. PATENT DOCUMENTS

| | | |
|---|---|---|
| 2002/0062372 A1 | 5/2002 | Hong et al. |
| 2002/0069420 A1 | 6/2002 | Russell et al. |
| 2002/0078174 A1 | 6/2002 | Sim et al. |
| 2002/0087612 A1 | 7/2002 | Harper et al. |
| 2002/0087797 A1 | 7/2002 | Adrangi |
| 2002/0120710 A1 | 8/2002 | Chintalapati et al. |
| 2002/0129123 A1 | 9/2002 | Johnson et al. |
| 2002/0147966 A1 | 10/2002 | Frazier |
| 2002/0152328 A1 | 10/2002 | Kagan et al. |
| 2002/0161908 A1 | 10/2002 | Benitez et al. |
| 2003/0061378 A1 | 3/2003 | Mazzitelli |
| 2003/0079154 A1 | 4/2003 | Park et al. |
| 2003/0135464 A1 | 7/2003 | Mourad et al. |

OTHER PUBLICATIONS

Li et al., "An Approach for Estimation of Software Aging in a Web Server", 2002, IEEE.

Mercer et al., Processor capacity reserves: an abstraction for managing processor usage, Workstation Operating sytems, 1993. Proceedings. Fourth Wordshop on, Oct. 14-15, 1993 pp. 129-134.

Zhou et al., Processor-pool-based scheduling for large-scale NUMA multiprocessors, Joint Internation Conference on Measurement and Modeling of Computer Systems, pp. 133-142, Year of Publication: 1991.

MULTI-LEVEL PERSISTED TEMPLATE CACHING

RELATED APPLICATIONS

This is a continuation of U.S. patent application Ser. No. 10/389,163, filed Mar. 14, 2003 and assigned to Microsoft Corporation, and hereby incorporated by reference, which further claimed the benefit of priority from, and incorporated by reference the entire disclosure of, U.S. Provisional Patent Application Ser. No. 60/366,794, filed Mar. 22, 2002, and titled "ASP Persisted Template Cache".

TECHNICAL FIELD

The present invention relates generally to computers and like devices, and more particularly to methods, apparatuses and systems for persisting data associated with server applications and devices.

BACKGROUND

The popularity of the Internet, and in particular, the portion of the Internet known as the World Wide Web, continues to grow. The World Wide Web is basically a collection of computers that are operatively linked together through a plurality of communication networks. Typically, users access the World Wide Web through a personal computer or like device, which is connected to the Internet via a modem of some type. For example, many users of the World Wide Web connect to the Internet using a dial-up telephone networked modem configured to establish data communications through an Internet Services Provider (ISP). Other users connect to the Internet with a faster modem, e.g., a cable modem, digital subscriber line (DSL) modem, etc.

Regardless of how a user ultimately connects to the Internet/World Wide Web, once connected, the user typically accesses information available therein by using a web browser or like application. A web browser is configured to access web pages that are provided through the Internet by other computers. For example, one or more web server computers may be connected to the Internet and configured with one or more web sites or other supporting web applications. A web site typically has one or more static web pages and/or is capable of supplying one or more dynamically generated web pages that the user may selectively download, view and possibly interact with.

To identify a particular web site/page, the user will typically select a hyper-link to the desired web site/page or may choose to manually enter a unique name for the web site/page. The most common name used for identifying a web site/page is known as the uniform resource locator (URL). By entering a URL, the user will be connected to an appropriate web server which hosts the applicable web application(s), and the requested web page will be downloaded, in this case using a hypertext transfer protocol (HTTP), to the web browser. Within the Internet itself, the selected URL is associated with a specific Internet Protocol (IP) address. This IP address takes the form of a unique numerical identifier, which has been assigned to the targeted web server. Thus, a user may also directly enter an IP address in the web browser. However, the majority of users tend to favor the use of the more easily remembered and entered URL.

A web server application typically receives the web request from the web browser and provides it to a web application or worker process. The worker process responds to the web request and eventually generates a web request response that is then sent back to the web browser.

There is a continuing desire to provide a quick response from the worker process and to make good use of available web server resources. One bottleneck that has existed in many web servers are delays associated with preparing the web request response to be sent back to the web browser (client).

Some web request responses are generated based on scripts or other active or dynamic information. Processing these web request responses for each request tends to be time-consuming and/or computationally-intensive. Storing the resulting web request responses as templates and reusing the templates can save time and/or reduce the load on computational resources. Unfortunately, the amount of available memory is typically limited and therefore the number of templates that can be buffered is also limited.

It would be beneficial to have improved methods and arrangements that would allow for even more templates to be buffered but without requiring additional expensive memory/hardware.

SUMMARY

Methods, apparatuses and systems are provided for use with a web server device or other like computing device, and which provide for a multiple-level template storage arrangement that includes a first level storage mechanism within primary memory and at least one subsequent level storage mechanism within a secondary memory device.

For example, the above stated needs and others are met by an apparatus that includes a primary memory, a secondary memory, and logic that is configured to selectively store template data in a first level template cache in the primary memory and to selectively store at least a portion of the template data in at least one subsequent level template cache in the secondary memory.

The template data may include, for example, a template flat structure portion associated with at least a portion of at least one web page and a corresponding template meta information portion. The first level template cache may include a buffer or other like mechanism that is suitable for storing the template data associated with the web page.

In certain implementations, the logic is configured to selectively store the template data in the buffer if a web request demand level for the web page exceeds a first level threshold value. The web request demand level may, for example, be determined over a defined period of time by the logic.

Thus, the logic may be configured to selectively stop storing the template data associated with the web page in the buffer if the logic determines that the web request demand level for the web page does not exceed a first level threshold value. In which case, the logic may be configured to selectively store at least a portion of the template data associated with the web page in the secondary memory when the web request demand level for the web page does not exceed the first level threshold value. Furthermore, the logic can be configured to selectively store at least a second portion of the template data associated with the web page in the primary memory, but not in the buffer, if the logic determines that the web request demand level for the web page does not exceed the first level threshold value. For example, sensitive template meta data may be stored in the primary memory to keep it from being stored on the secondary memory.

BRIEF DESCRIPTION OF THE DRAWINGS

A more complete understanding of the various methods, apparatuses and systems of the present invention may be had by reference to the following detailed description when taken in conjunction with the accompanying drawings wherein.

DESCRIPTION

Figure 1:
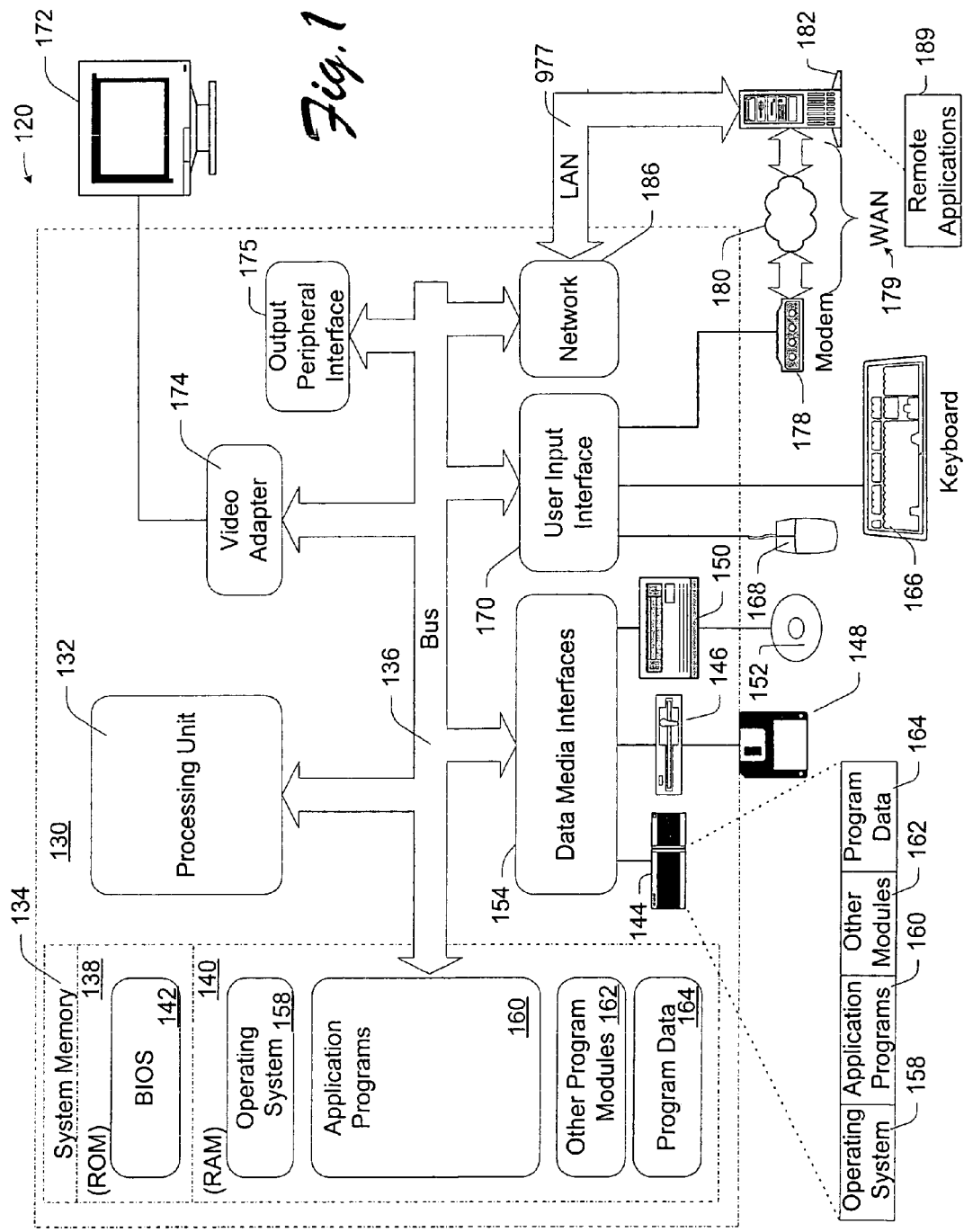
FIG. 1 is a block diagram that depicts an exemplary device, in the form of a computer, which is suitable for use with certain implementations of the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a server computer, which may take the form of a personal computer, a workstation, a dedicated server, a plurality of processors, a mainframe computer, etc. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described methods and arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

The above arrangement and others like it may be used to support client-server communications and processes, such as, for example, a network based web browser and web sever configuration. As mentioned in the Background section, one common example of such a configuration is the World Wide Web portion of the Internet. Here, web browsers may request essentially static web pages from web servers or non-static web pages, such as, for example, Active Server Pages (ASPs), Common Gateway Interface (CGI) services, or other capabilities/services that provide dynamically generated web pages, files, data, etc.

The exemplary implementations herein will focus mainly on applying improved techniques to servers that are configured to provide ASP services. It should be understood, however, that these techniques are also adaptable to other services, such as, for example, those that dynamically produce and/or otherwise provide non-static data to browsers or other like client programs.

With this in mind, ASP is basically a specification for a dynamically created Web page with a .ASP extension. Contemporary ASP services tend to employ ActiveX scripting, Visual Basic Scripting, Jscript code, and the like. Thus, for example, when a browser requests an ASP page, the Web server typically generates a page with HTML code and sends it back to the browser. While ASP pages are similar to CGI scripts, they also enable Visual Basic programmers to work with familiar tools.

In accordance with certain aspects of the present invention, when an ASP file is accessed for the first time, it is compiled using an ASP compiler. The ASP compiler converts the ASP source code into a format that a script engine or the like can understand and follow to execute the code. This is basically an intermediate code stage. For ASP, this may involve simple tasks, such as, for example, stripping the <% and %> and replacing the <%="some string" %> with Response.Write("some string"). The result of compilation process is what is referred to as a template.

In addition, the script blocks are often converted to UNICODE as required by the script engine. Here, for example, blocks of HTML may be stored off in a section of the template and replaced with Response.WriteBlock(index), where index corresponds to the index into the blocks of HTML stored in the template, includes are included, etc.

The resulting template is a flat memory structure (e.g., contiguous memory block). By way of example, the resulting template may include a main script block, one or more secondary script blocks (e.g., code in <SCRIPT runat=server>), one or more HTML blocks, header data and the like (e.g., mapping out the template).

It has been found that it can be significantly computationally expensive and/or time-consuming to compile each file and produce a resulting template each time an ASP is requested or desired.

For various reasons, the template turns out to be one of the more complex features of the ASP scheme. For example, a template may need to read and collate various ASP files into one contiguous block of memory that contains all the scripts and pointers to functions/procedures. The template is organized in a form readable by the script engines. Internally, for example, the template can be represented by a CTemplate object or the like. Here, the CTemplate routines (e.g., a ParseSegmnent, a ParseHTMLSegment, a ParseScriptSegment, etc.) parse the source file(s) and included file(s) to produce a contiguous block of memory. This is then brought together by the Compile routine. A CWorkStore object may be implemented to maintain all the information (such as, e.g., a line number, a start of each block, etc.) necessary about the ASP file.

Once the template has been generated it becomes a candidate for caching, such that the ASP services need not always compile the files. For example, if the ASP service (e.g., logic) finds the particular template it is looking for in a cache portion of the memory, then it will just call a "deliver" routine or the like. The deliver routine may also be configured to determine if the cached template should be delivered. For example, the deliver routine may verify that the permission(s) on the template are compatible and/or that the template is executable under the current authentication mechanism.

Usually, it does not take too long for cached templates to fill up available cache or other like memory. Thus, eventually, some templates, typically time-wise older templates are dropped from the limited memory space. This means that dropped templates need to be regenerated when needed again.

In accordance with certain aspects of the present invention, a multiple level caching architecture is proved for handling templates. For example, in certain exemplary implementations, a two or more level architecture is provided in which a first level template cache uses a primary memory resource (e.g., memory circuits) and at least one subsequent level template cache uses a secondary memory resource (e.g., a disk drive, tape, optical disc drive, etc.). When a template is dropped from the first level template cache it is then added to the subsequent level template cache. If more than one subsequent level template cache is provided, then there can be a hierarchy of subsequent level template caches that a template may move between, for example, depending upon demand for it. Also, in certain implementations, a template in a subsequent level template cache may be moved "up" one or more levels, and including being moved up to the first level template cache.

Figure 2:
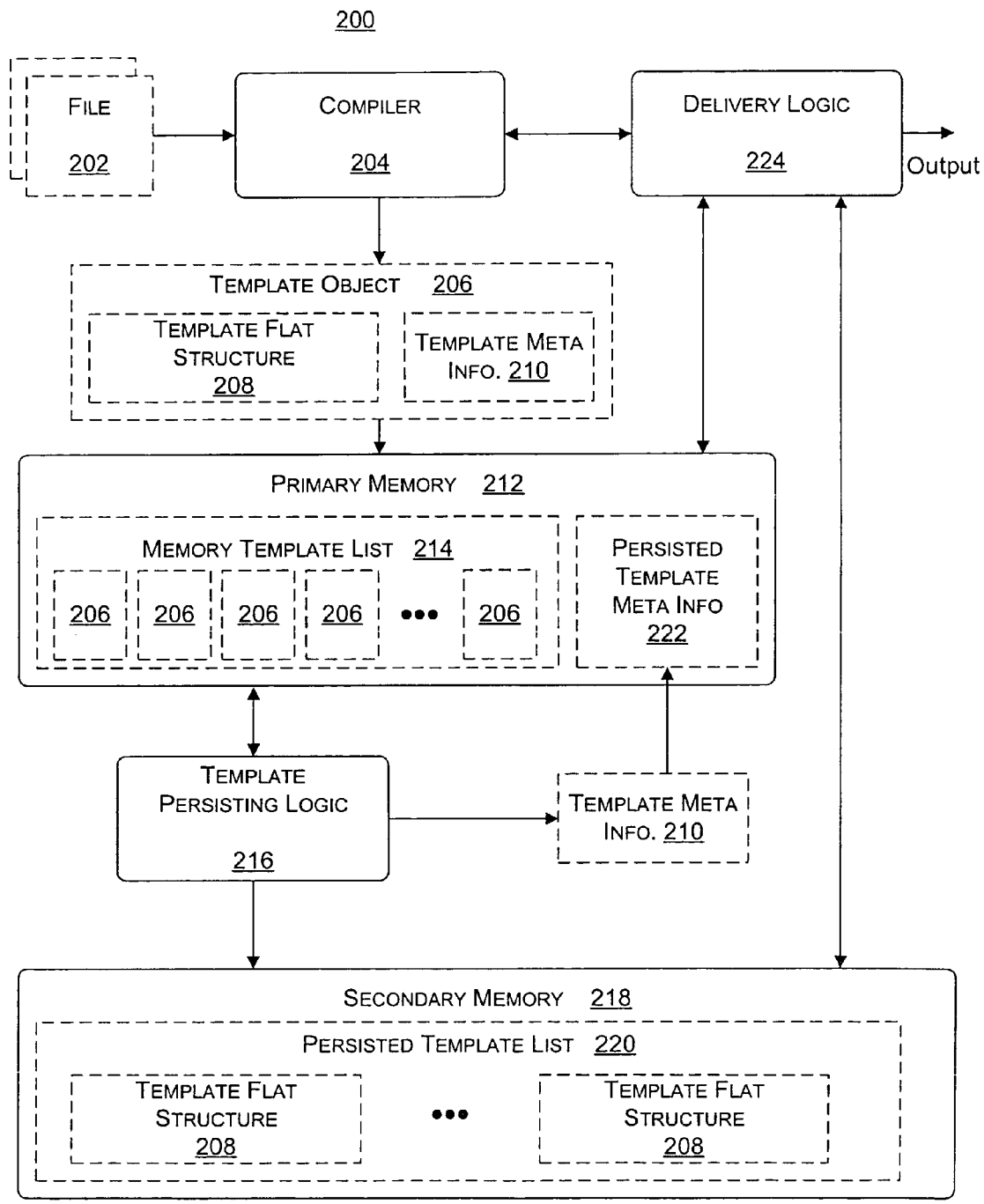
FIG. 2 is a block diagram depicting a multiple level caching arrangement suitable for use in at least one computer or like device that is configured to generate and/or or output template or other data files, in accordance with certain exemplary implementations of the present invention.

Attention is drawn to FIG. 2, which is a block diagram illustratively depicting certain features associated with an exemplary two-level template caching arrangement 200 for use in a server or other like system/device. Template caching arrangement 200 includes a first level template cache in the form of a memory template list 214 within primary memory 212 and a subsequent level template cache in the form of a persisted template cache 220 within secondary memory 218.

As shown in FIG. 2, one or more files 202 are provided to a compiler 204 which produces a template object 206. In certain exemplary implementations, template object 206 includes a template flat structure portion 208 and related template meta information 210.

In this example, template object 206 is stored in primary memory 212 within a memory template list 214. Although referred to as a list, memory template list 214 may take other forms. For example, in certain implementations, memory template list 214 includes a buffer configuration that is managed as a Least Recently Used (LRU) buffer in which a plurality of template objects are stored and buffered so long as the template objects are requested or otherwise accessed often enough over a period of time. For example, template persisting logic 216 may leave a template object 206 buffered in memory template list 214 provided that it is accessed at least twice within a defined period of time. Thus, if a template object is not accessed often enough during the period of time, then it will be dropped or removed from memory template list 214. Here, for example, one or more threshold values may be used to define the demand levels required for template data to remain at a given level in the caching arrangement and/or to be moved to another level.

Template objects buffered within memory template list 214 are available to be output by delivery logic 224. In the past, if a template object gets dropped from memory template list 214, then compiler 204 would need to recompile file(s) 202 to create a new template object 206 that would then be buffered in memory template list 214 and made available to delivery logic 224.

With arrangement 200, however, now there is at least one subsequent level of template caching available. Hence, for example, when template persisting logic 216 determines that a particular template object 206 needs to be dropped from memory template list 214, it moves or otherwise stores at least the template flat structure portion 208 to persisted template list 220 in at least one secondary memory 218. The term "list" is also used here simply to represent any adequate data storage form that will allow the template flat structure to be stored and retrieved. In certain implementations, for example, second memory 218 includes at least one hard disk drive (HDD) and persisted template list 220 includes a plurality of template flat structures stored to the HDD using conventional techniques (e.g., NTFS, etc.) This means, of course, that unlike the exemplary primary memory 212, the template flat structure may not actually be stored in a non-contiguous manner.

As illustrated, in accordance with certain aspects of the exemplary implementation, template persisting logic 216 is configured to buffer template meta information 210 (corresponding to the template flat structures moved into the persisted template list) in persisted template meta information 222, shown here within primary memory 212. One reason that the template meta information 210 essentially remains in primary memory 212 rather than being written to secondary memory is that in certain exemplary implementations template meta information 210 includes security related information/data that should not be written to the secondary memory. By way of example, template meta information 210 may include access control list (ACL) information or the like.

With this multiple level arrangement, delivery logic 224 can then access both primary memory 212 and/or secondary memory as needed to retrieve or otherwise access a desired template flat structure 208 and corresponding template meta information 210 and when deemed appropriate output at least the template flat structure.

Template persisting logic 216 may also be configured to selectively drop or remove template flat structures from persisted template list 220 and also corresponding template meta information from persisted template meta information 222. Those skilled in the art will also recognize that different searching techniques/algorithms may be implemented in the logic of arrangement 200 to locate stored template data. For example, in certain implementations LKR hashing techniques may be employed to locate templates by template names or identifiers.

Arrangement 200 and other like multiple level caching arrangements have the advantage of being able to actively buffer more templates without having to increase the size of the primary memory (e.g., physical solid state memory, RAM, etc.). By storing more templates in two or more levels, a "hot" template (one that is desired more often) is buffered and ready to be delivered immediately from the primary memory, while a "less hot" template may be ready fair quickly for delivery since it is stored in secondary memory. This tends to significantly increase the efficiency of the server and also reduce the hardware costs since secondary memory is often cheaper than primary memory. Of course, new templates that are not currently being stored in one of the levels will need to be compiled, but once compiled these templates may be persisted for sometime in this type of multiple level caching arrangement.

While different logic blocks are depicted in FIG. 2, it should be understood that this was simply done for the convenience of this description. An actual implementation may include one or more logic functions, programs, routines, etc. Also, it is noted that the term "logic" as used herein is meant to represent hardware, firmware, software, and/or any combination thereof that is suitable for performing the logical and any other related capability that is required to perform all or part of a desired function and/or provide all or part of a desired capability.

Although some preferred implementations of the various methods and apparatuses of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention.

What is claimed is:

1. An apparatus comprising:
   primary memory;
   secondary memory; and
   logic operatively coupled to said primary and secondary memory and configured to selectively store template data, to be used in dynamic generation of one or more web pages, in a first level template cache in said primary memory and to selectively store at least a portion of said template data in at least one subsequent level template cache in said secondary memory, wherein the selectively storing template data in said primary memory and said secondary memory is based at least in part on a demand level of the template data required in dynamic generation of the one or more web pages.

2. The apparatus as recited in claim 1, wherein said template data includes at least a template flat structure portion associated with at least a portion of at least one web page.

3. The apparatus as recited in claim 1, wherein said first level template cache includes a buffer suitable for storing template data associated with at least one web page.

4. The apparatus as recited in claim 1, wherein said primary memory includes solid state memory circuits and said secondary memory includes at least one data storage medium selected from a group of data storage media including magnetic disk media, magnetic tape media, and optical disc media.

5. The apparatus as recited in claim 1, wherein said logic includes at least one processing unit.

6. The apparatus as recited in claim 1, wherein said logic further includes:
   compiler logic configured to generate at least a portion of said template data based on at least one file;
   template persisting logic operatively coupled to said complier logic, said primary memory and said secondary memory and configured to selectively store at least a portion of said template data generated by said compiler logic in said primary memory and said secondary memory; and
   delivery logic operatively coupled to said complier logic, said template persisting logic, said primary memory, and said secondary memory, and configured to output at least a portion of a web page using said stored template data.

7. The apparatus as recited in claim 1, wherein said template data includes Active Server Page (ASP) template data.

8. The apparatus as recited in claim 1, wherein at least a portion of said logic is part of a web server device.

9. A method for use in a web server device having at least one processing unit, primary memory and secondary memory, the method comprising:
   selectively storing template data in a first level template cache in said primary memory, the template data being used in dynamic generation of one or more web pages; and
   subsequently selectively storing at least a portion of said template data in at least one subsequent level template cache in said secondary memory, wherein the selectively storing template data in said primary memory and said secondary memory is based at least in part on a demand level of the template data required in dynamic generation of the one or more web pages.

10. The method as recited in claim 9, wherein said template data includes at least a template flat structure portion associated with at least a portion of at least one web page.

11. The method as recited in claim 9, wherein selectively storing template data in said first level template cache in said primary memory further includes determining if a web request demand level for said web page exceeds a first level threshold value and if so, then selectively storing template data in said first level template cache.

12. The method as recited in claim 11, further comprising determining said demand level during a defined period of time.

13. The method as recited in claim 11, further comprising not storing said template data associated with said web page if said web request demand level for said web page does not exceed a first level threshold value.

14. The method as recited in claim 9, wherein said template data includes Active Server Page (ASP) template data.

15. A computer-readable medium having computer implementable instructions for configuring at least one processing unit operatively coupled to a primary memory and at least one secondary memory to perform acts comprising:
   selectively storing template data in a first level template cache in said primary memory, the template data being used in dynamic generation of one or more web pages; and
   subsequently selectively storing at least a portion of said template data in at least one subsequent level template cache in said secondary memory, wherein the selectively storing template data in said primary memory and said secondary memory is based at least in part on a demand level of the template data required in dynamic generation of the one or more web pages.

16. The computer-readable medium as recited in claim 15, wherein said template data includes at least a template flat structure portion associated with at least a portion of at least one web page.

17. The computer-readable medium as recited in claim 15, wherein selectively storing template data in said first level template cache in said primary memory further includes determining if a web request demand level for said web page exceeds a first level threshold value and if so, then selectively storing template data in said first level template cache.

18. The computer-readable medium as recited in claim 17, further comprising determining said demand level during a defined period of time.

19. The computer-readable medium as recited in claim 17, further comprising not storing said template data associated with said web page if said web request demand level for said web page does not exceed a first level threshold value.

20. The computer-readable medium as recited in claim 15, wherein said template data includes Active Sewer Page (ASP) template data.

* * * * *